US012771494B2

(12) United States Patent
Henttonen et al.

(10) Patent No.: US 12,771,494 B2
(45) Date of Patent: Oct. 20, 2026

(54) FLEXIBLE SERVING CELL FREQUENCY

(71) Applicant: Nokia Technologies Oy, Espoo (FI)

(72) Inventors: Tero Henttonen, Espoo (FI); Hiromasa Umeda, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 284 days.

(21) Appl. No.: 18/487,096

(22) Filed: Oct. 15, 2023

(65) Prior Publication Data

US 2024/0129076 A1 Apr. 18, 2024

Related U.S. Application Data

(60) Provisional application No. 63/416,568, filed on Oct. 16, 2022.

(51) Int. Cl.

| | |
|---|---|
| ***H04L 5/00*** | (2006.01) |
| ***H04W 72/1268*** | (2023.01) |
| ***H04W 76/15*** | (2018.01) |

(52) U.S. Cl.

CPC ......... *H04L 5/001* (2013.01); *H04W 72/1268* (2013.01); *H04W 76/15* (2018.02)

(58) Field of Classification Search

CPC ..... H04L 5/001; H04L 5/0053; H04L 5/1469; H04L 5/0073; H04L 5/0092; H04L 5/0098; H04W 72/1268; H04W 76/15; H04W 72/1263

See application file for complete search history.

(56) References Cited

U.S. PATENT DOCUMENTS

| | | | | |
|---|---|---|---|---|
| 2011/0103332 A1 | 5/2011 | Kuo | | |
| 2015/0085782 A1* | 3/2015 | Seo | ........................ | H04L 1/1896 370/329 |
| 2016/0112178 A1* | 4/2016 | Yi | ........................ | H04W 72/23 370/280 |
| 2016/0255577 A1 | 9/2016 | Kazmi et al. | | |
| 2019/0357238 A1* | 11/2019 | Zhou | ..................... | H04W 72/23 |
| 2020/0145280 A1 | 5/2020 | Cirik et al. | | |

(Continued)

FOREIGN PATENT DOCUMENTS

EP 3057369 A1 8/2016

OTHER PUBLICATIONS

"Revised SI: Study on enhancement for 700/800/900MHz band combinations for NR", 3GPP TSG RAN Meeting #96, RP-221464, Agenda: 9.2.16, CATT, Jun. 6-9, 2022, 4 pages.

(Continued)

*Primary Examiner* — Mandish K Randhawa

(74) *Attorney, Agent, or Firm* — Barta Jones, PLLC

(57) ABSTRACT

Systems, methods, apparatuses, and computer program products for configuring a user equipment to operate in carrier aggregation in a serving cell with a primary cell and one or more secondary cell are provided. For example, a method can include receiving, from a primary cell, a carrier aggregation configuration of a secondary cell with uplink. The configuration indicates that downlink is deactivated for the secondary cell. The carrier aggregation configuration is applicable to carrier aggregation of the primary cell and the secondary cell. The method also includes communicating with the secondary cell based on the configuration of the secondary cell.

14 Claims, 3 Drawing Sheets

(56) References Cited

U.S. PATENT DOCUMENTS

2021/0184824 A1 6/2021 Kwak et al.

OTHER PUBLICATIONS

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.7.0, Sep. 2022, 723 pages.

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.7.0, Sep. 2022, pp. 1-217.

"3rd Generation Partnership Project; Technical Specification Group Radio Access Network; NR; Physical layer procedures for control (Release 17)", 3GPP TS 38.213, V17.3.0, Sep. 2022, pp. 1-260.

Extended European Search Report received for corresponding European Patent Application No. 23193978.6, dated Mar. 5, 2024, 17 pages.

"RAN4#88 Meeting Report", 3GPP TSG-RAN WG4 Meeting #88-Bis, R4-18xxxxx, Agenda Item : 3, Oct. 8-12, 2018, 900 pages.

* cited by examiner

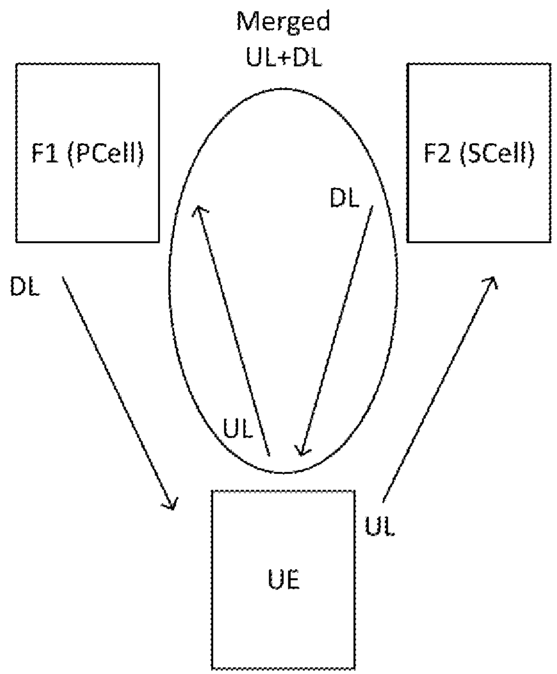

FIG. 1

| Carrier | Slot 1 | Slot 2 | Slot 3 |
|---|---|---|---|
| PCell UL | x | x | |
| PCell DL | x | x | x |
| SCell UL | x | x | x |
| SCell DL | | | x |

FIG. 2

| Carrier | Used | PDCCH |
|---|---|---|
| PCell UL | Yes | PCell |
| PCell DL | Yes | PCell |
| SCell UL | Yes | PCell |
| SCell DL | No | N/A |

FIG. 3

RRC Configuration 1

| Carrier | Used | PDCCH |
|---|---|---|
| PCell UL | Yes | PCell |
| PCell DL | Yes | PCell |
| SCell UL | Yes | PCell |
| SCell DL | No | N/A |

Switch Between Configurations using DCI or MAC

RRC Configuration 2

| Carrier | Used | PDCCH |
|---|---|---|
| PCell UL | No | N/A |
| PCell DL | Yes | PCell |
| SCell UL | Yes | PCell |
| SCell DL | Yes | PCell |

FIG. 4

FLEXIBLE SERVING CELL FREQUENCY

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to configuring a user equipment to operate in carrier aggregation in a serving cell with a primary cell and one or more secondary cell.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. From release 18 (Rel-18) onward, 5G is referred to as 5G advanced. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus may include at least one processor and at least one memory storing instructions. The instructions stored in the at least one memory, when executed by the at least one processor, may cause the apparatus at least to perform receiving, from a primary cell, a carrier aggregation configuration of a secondary cell with uplink. The configuration may indicate that downlink is deactivated for the secondary cell. The carrier aggregation configuration may be applicable to carrier aggregation of the primary cell and the secondary cell. The instructions stored in the at least one memory, when executed by the at least one processor, may also cause the apparatus at least to perform communicating with the secondary cell based on the configuration of the secondary cell.

An embodiment may be directed to an apparatus. The apparatus may include at least one processor and at least one memory storing instructions. The instructions, when executed by the at least one processor, cause the apparatus at least to perform sending, from a primary cell to a user equipment, a carrier aggregation configuration of a secondary cell with uplink. The carrier aggregation configuration may indicate that downlink is deactivated for the secondary cell. The carrier aggregation configuration may be applicable to carrier aggregation of the primary cell and the secondary cell.

An embodiment may be directed to a method. The method can include receiving, from a primary cell, a carrier aggregation configuration of a secondary cell with uplink. The configuration may indicate that downlink is deactivated for the secondary cell. The carrier aggregation configuration may be applicable to carrier aggregation of the primary cell and the secondary cell. The method can also include communicating with the secondary cell based on the configuration of the secondary cell.

An embodiment may be directed to a method. The method can include sending, from a primary cell to a user equipment, a carrier aggregation configuration of a secondary cell with uplink. The carrier aggregation configuration may indicate that downlink is deactivated for the secondary cell. The carrier aggregation configuration may be applicable to carrier aggregation of the primary cell and the secondary cell. The method can also include communicating with user equipment based on or consistent with the configuration of the secondary cell.

An embodiment can be directed to an apparatus. The apparatus can include means for receiving, from a primary cell, a carrier aggregation configuration of a secondary cell with uplink. The configuration indicates that downlink may be deactivated for the secondary cell. The carrier aggregation configuration may be applicable to carrier aggregation of the primary cell and the secondary cell. The apparatus can also include means for communicating with the secondary cell based on the configuration of the secondary cell.

An embodiment can be directed to an apparatus. The apparatus can include means for sending, from a primary cell to a user equipment, a carrier aggregation configuration of a secondary cell with uplink. The carrier aggregation configuration may indicate that downlink is deactivated for the secondary cell. The carrier aggregation configuration may be applicable to carrier aggregation of the primary cell and the secondary cell. The apparatus can also include means for communicating with user equipment based on or consistent with the configuration of the secondary cell.

BRIEF DESCRIPTION OF THE DRAWINGS

For proper understanding of example embodiments, reference should be made to the accompanying drawings, wherein:

FIG. 1 illustrates a flexible serving cell arrangement according to certain embodiments;

FIG. 2 illustrates a time division multiplexing pattern for shared uplink and downlink, according to certain embodiments;

FIG. 3 illustrates a semi-static radio resource control configuration for shared uplink and downlink, according to certain embodiments;

FIG. 4 illustrates dynamic switching between radio resource control configurations, according to certain embodiments;

DETAILED DESCRIPTION

Figure 5:
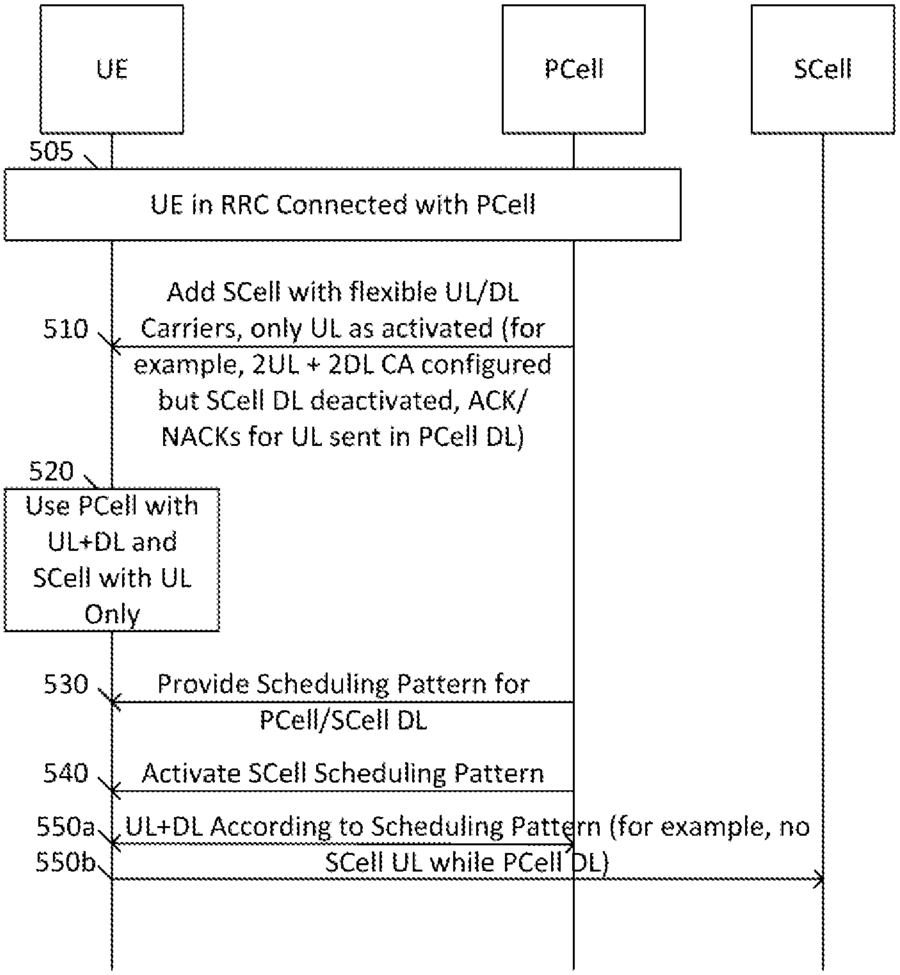
FIG. 5 illustrates a signal flow of shared uplink and downlink configuration, according to certain embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing configuring a user equipment to operate in carrier aggregation in a serving cell with a primary cell and one or more secondary cell, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Carrier aggregation (CA) was defined for downlink (DL) carriers in high-speed packet access (HSPA), as well as for both uplink (UL) and DL carriers in long term evolution (LTE) release 10 (Rel-10). Regulatory requirements for UL emissions have required that the user equipment (UE) has to first receive network signals before being allowed to transmit. This requirement has led to the CA framework always assuming that the number of DL CA carriers is greater than or equal to the number of UL CA carriers. In case of time division duplex (TDD)+frequency division duplex (FDD) CA, the TDD carrier is counted as having both UL and DL.

Supplementary uplink was defined in new radio (NR) release 15 (Rel-15) as an additional UL carrier for coverage purposes. Based on the DL signal conditions, UE may either use the normal UL or the supplementary UL for a serving cell. While a cell could have two UL configurations, a UE may still always only use one UL carrier at a time for the serving cell.

It may be valuable to enable simultaneous transmission on two UL bands and simultaneous reception on two or three bands. NR bands are designed by the prefix, n, followed by an integer. The n8 band is sometimes referred to as the 900 MHz 5G band, and is a band used in many countries because it already in use by third generation (3G) and fourth generation (4G) networks. Similarly, the n5 band is sometimes referred to as the 850 MHz 5G band, and is likewise a band used in many countries because of the availability due to the existing use for 3G and 4G networks.

In greater detail, the UL allocation for n5 may be from 824 to 849 MHz, while the downlink allocation for n5 may be from 869 to 894 MHz. The UL allocation for n8 may be from 880 to 915 MHz and the DL allocation for n8 may be from 925 to 960 MHz. Accordingly, there may be overlap between the UL allocation of n8 and the downlink allocation of n5, particularly from 880 to 894 MHz.

Since the DL of n5 and UL of n8 are overlapping, not all CA configurations may be possible: the UL of n5 and the DL of n8 can be used simultaneously, but to avoid overlap it may be necessary to pick between n8's UL and n5's DL. In this example, 1UL+2DL of (UL, DL)=(n5, n5+n8) is possible while 1UL+2DL of (UL, DL)=(n8, n5+n8) is not possible with normal UE design. The 2UL+1DL of (UL, DL)=(n5+n8, n8) is possible from the radio frequency (RF) perspective with some conventional intermodulation distortion (IMD) issue because the frequencies are non-overlapping, but specifications do not support that option, because UL CA order is greater than the DL CA order. The specifications have been restricted to this ever since the CA was defined for simplicity reasons and because DL CA has been the primary use case so far.

From a specification support perspective, it may be possible to configure UE to 2DL CA+2 UL CA on n5+n8. In such a case, the n5 DL and n8 UL could be overlapping or close enough to cause serious desensitization to the n5 DL reception when the n8 UL is transmitted.

From a radio resource control (RRC) perspective, there may be additional limitations to the UL/DL configurations as shown below.

For a primary cell (PCell) configuration, both uplink and downlink may always need to be present. A cell may not signal an UL configuration but that may cause the UE not to camp on the cell. A handover (HO) may still be possible to such a cell, but the handover may fail as the UE may notice upon reading system information (SI) that the UL component was missing. The UE might therefore behave unpredictably, as such a circumstance may not be anticipated by the UE's logic.

In IDLE, INACTIVE and CONNECTED modes, a bandwidth part (BWP) and channel bandwidth (CBW) may be used to control the frequency resources that the UE receives from a cell. Control resource set (CORESET) #0, which determines the frequency resources that the UE considers for receiving DL scheduling allocations, and synchronization signal block (SSB), which the UE acquires for synchronization to the cell and for reception of system information from the cell, may be inside bandwidth part (BWP) in frequency range (FR) 1, because only CORESET multiplexing pattern 1 may be allowed. BWP in connected mode can be reconfigured to use a common CORESET, but only if UE supports a capability that allows that (which is called bwp-WithoutRestriction in the NR system), but the configuration may still be required to be compatible with SIB 1 configuration, which could cause problems in HOs.

Using PCell as a cell without uplink has not been possible in the current NR standards and PCell always requires both UL and DL. In those same standards, DL configuration may always be required for SCell, while UL may be optional. Changing a DL-only Scell to Scell with UL and DL Scell may require release and add of the SCell. SSB may not always be needed for SCells since SCells can refer to another cell's SSB for those UEs that support the corresponding UE capability (which is called bwp-WithoutRestriction in NR), for example the same as active BWP selection in PCell. Thus, using SCell as a cell without DL has not been possible in current NR standards, while using SCell as a cell without UL may be possible in the current NR standards.

Carrier aggregation, therefore, may allow PCell with UL+DL and SCells with DL or UL+DL, but not Scells with UL-only or with flexible UL/DL-assignments. UL Tx switching may allow toggling between UL CA and UL multiple input/multiple output (MIMO), primarily for FDD+SUL and FDD+TDD CA cases where the RF capability for the additional UL may otherwise be wasted. Supplementary UL may allow the UE to select one of two UL frequencies to use, but may only allow the UE to use one of them.

FIG. 1 illustrates a flexible serving cell arrangement according to certain embodiments. As shown in FIG. 1, a UE can be connected to a primary cell using a first frequency set, F1, and to a secondary cell using a second frequency set, F2. These two sets can be overlapping, as in the case of n5 and n8 discussed above. The frequency sets may also contain disparate parts of frequencies, such as different frequencies for UL and DL, as is the case for FDD frequency bands, or the entire set may be usable for both UL and DL, as is the case for TDD frequency bands.

FIG. 2 illustrates a time division multiplexing pattern for shared uplink and downlink, according to certain embodiments. The pattern shown can be used in connection with the cell arrangement shown in FIG. 1. As shown in FIG. 2, there can be a TDM pattern for UL/DL usage. The network can configure a pattern that tells the UE when the UE can use the UL of serving cell 1 and the DL of serving cell 2. The network can configure the pattern to the UE using, for example, TDD patterns defining a hybrid automatic repeat request (HARQ) acknowledgment (ACK)-negative ACK (NACK) timing. Such a pattern will implicitly or explicitly determine how a cell without UL or DL sends or receives the HARQ responses to received or transmitted data FIG. 3 illustrates a semi-static radio resource control configuration for shared uplink and downlink, according to certain embodiments. The RRC configuration can be applicable to the cell arrangement shown in FIG. 1. The RRC configuration can be for UL/DL usage for serving cell. More particularly, the network can configure by RRC whether a specific serving cell can use DL or UL, including how such configuration could depend on other serving cells' UL or DL usage. Changing this configuration can be done via RRC reconfiguration. The network may also provide the UE with multiple stored RRC configurations for the serving cell UL/DL usage, and may control the used configuration by sending UE lower layer signalling such as Medium Access Control (MAC) Control Element (CE) or Downlink Control Information (DCI) format. The RRC configuration or reconfiguration can also fully define how each serving cell is scheduled.

FIG. 4 illustrates dynamic switching between radio resource control configurations, according to certain embodiments. The PCell and SCell may be scheduled using just the Physical Downlink Control Channel (PDCCH) of PCell DL, which may not be changed even when the SCell DL is active and PCell UL is inactive. The dynamic switching of FIG. 4 may be implemented in the cell arrangement shown in FIG. 1. The dynamically switched UL/DL usage for serving cells can be variously implemented. For example, the UE may be configured with multiple RRC configurations, which may then be swapped using DCI or MAC signaling. Each of the UEs RRC configurations, shown as RRC configuration 1 and RRC configuration 2 in this example, may for example be BWP-specific configurations. If, for example, per-BWP configurations are used, the swapping can be done with BWP switching, or if MAC CE is used, a MAC CE can be used for this.

The above-described embodiments may be variously implemented. For example, an SCell configuration can be provided that allows UL-only configuration. Thus, for example, a DL configuration may follow a DL of another serving cell. If paired with DL-only SCells, for example for the overlapping part, the configuration may allow existing MAC CEs to be used to activate/deactivate which UL/DL-part is active/inactive.

In certain embodiments, configurations can be added to link the DL of a serving to an UL of another serving cell. These additional configurations can permit reuse of previous CA configurations while adding restrictions to the UL/DL parts of the serving cells.

In certain embodiments, a TDM pattern can be defined between serving cells. A TDM pattern configuration can be added for UL/DL of the cells so that only one of the directions is used at a time, for example in an overlapping frequency band. This approach may permit adding configuration to both affected cells so that the UE's use of a different kind of CA configuration is identifiable. The TDM pattern may be explicitly signalled for all of the involved serving cells, or signalled to only one of the involved serving cells and implicitly determined for the other serving cells, or implicitly determined based on existing TDD or TDM configuration of one of the involved serving cells.

FIG. 5 illustrates a signal flow of shared uplink and downlink configuration, according to certain embodiments. The signal flow of FIG. 5 may be implemented in the cell arrangement shown in FIG. 1.

As shown in FIG. 5, at procedure 505, the UE may be in RRC connected state to a PCell. At 510, the PCell may message the UE with a configuration to add an SCell with flexible UL/DL carriers, with uplink only as activated. Thus, for example, the configuration may be a configuration of two uplink and two downlink carrier aggregation, but with the SCell downlink deactivated. ACK/NACKs for uplink may be sent in PCell DL.

In procedure 520, the UE may configure itself to use PCell with UL+DL and to use SCell with UL only. This configuration of the UE may be based on the message from the PCell at procedure 510.

In procedure 530, the PCell may provide a scheduling pattern for the PCell/SCell downlink. Moreover, in procedure 540, the PCell may activate the SCell scheduling pattern. Accordingly, in procedures 550*a* and 550*b*, the UE can communicate in UL and DL with PCell and SCell, following the scheduling pattern provided by PCell. The pattern may ensure that there is no SCell UL while PCell DL. Procedure 550*b* shows only UL, whereas procedure 550*a* shows UL and DL directions. Other implementations are also possible, with the signal flow of FIG. 5 being merely an example implementation.

In the above example, in procedures 510 and 520 the UE is configured with SCell that only has activated UL. Thus, UE only uses the UL for the SCell and the DL ACK/NACKs are sent over PCell DL. In certain embodiments, the PCell scheduling can indicate whether SCell UL scheduling follows the PCell UL scheduling. For example, the same physical resource block (PRB) allocation can be used for both carriers. In certain embodiments, the SCell UL can be cross-carrier scheduled from the PCell DL.

In procedures 530, 540, 550*a*, and 550*b*, the UE can be provided with at least one scheduling pattern for the PCell and SCell that indicates when each cell can be scheduled and the UE can operate accordingly.

In certain embodiments, the PCell and SCell scheduling occasions may be non-overlapping. For example, when PCell is scheduled, SCell is not. In certain embodiments, as another option, the PCell DL can only be scheduled when SCell UL is scheduled and SCell UL/PCell DL can be scheduled at the same time.

In certain embodiments, as a further example, the PCell UL can only be scheduled when SCell DL is scheduled and SCell DL/PCell UL can be scheduled at the same time. As yet another option, the scheduling pattern can be dynamically switched according to received DCI format or MAC CE signaling, as mentioned above with reference to FIG. 4.

Certain embodiments relate to the overlap between PCell and SCell, but this is just an example. In certain embodiments, the PCell and SCell in previous cases may instead be one SCell and another SCell. For example, the UE may support bands n1, n5 and n8, for example CA_n1-n5-n8, so that the PCell is on n1 and SCells are on n5 and n8. In such cases, the SCells on n5 and n8 may be used in the same way as previously illustrated: SCell on n8 may use UL+DL and SCell on n5 may use only UL, or SCell on n8 may only use DL and SCell on n5 may use UL+DL, and the configurations can be switched as described above.

Figure 6:
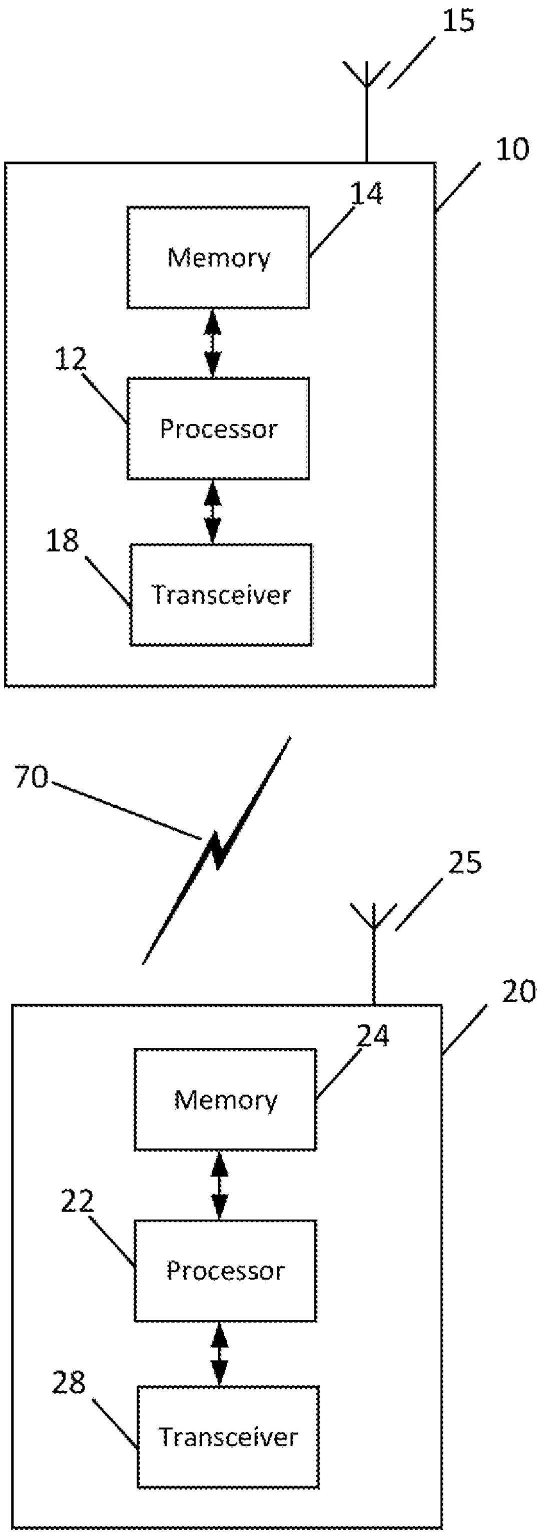
FIG. 6 illustrates an example block diagram of a system, according to an embodiment.

FIG. 6 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 6.

As illustrated in the example of FIG. 6, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to configuring a user equipment to operate in carrier aggregation in a serving cell with a primary cell and one or more secondary cell.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultra-wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-5, or any other method described herein. In some embodiments, as discussed herein, apparatus 10 may be configured to perform a procedure relating to providing configuring a user equipment to operate in carrier aggregation in a serving cell with a primary cell and one or more secondary cell, for example.

FIG. 6 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6.

As illustrated in the example of FIG. 6, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-5, or any other method described herein. For example, in an embodiment, apparatus 20 may be controlled to perform a process relating to providing configuring a user equipment to operate in carrier aggregation in a serving cell with a primary cell and one or more secondary cell, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may provide various benefits and/or advantages. For example, certain embodiments may provide a way to configure a user equipment with carrier aggregation in cases where the number of UL carriers may be fewer than the number of DL carriers. Moreover, certain embodiments may advantageously address scenarios where the uplink of one cell overlaps with downlink of another cell in carrier aggregation.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium. The term "non-transitory" as used herein, is a limitation of the medium itself (i.e. tangible, not a signal) as opposed to a limitation on data storage persistency (e.g. RAM vs. ROM).

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

ACK Acknowledgement
BWP Bandwidth Part
CA Carrier Aggregation
DC Dual Connectivity
DCI Downlink Control Information
DL Downlink
eNB evolved Node-B
FDD Frequency Domain Duplexing
gNB 5G Node-N
HO Handover
LTE Long Term Evolution
HSPA High-Speed Packet Access
MAC Medium Access Control
MIMO Multiple Input Multiple Output
NACK Negative Acknowledgement
NR New Radio
PCell Primary Cell
RRC Radio Resource Control
Rx Reception
SCell Secondary Cell
SSB Synchronization Signal Block
SUL Supplementary Uplink
TDD Time Domain Duplexing
TDM Time Domain Multiplexing
Tx Transmission
UE User Equipment
UL Uplink

What is claimed is:

1. An apparatus, comprising:

at least one processor; and at least one memory storing instructions that, when executed by the at least one processor, cause the apparatus at least to perform receiving, from a primary cell, while the apparatus is in a radio resource control connected state with the primary cell, a radio resource control message comprising a carrier aggregation configuration of a secondary cell with uplink, wherein the configuration indicates that downlink is deactivated for the secondary cell, wherein the carrier aggregation configuration is applicable to carrier aggregation of the primary cell and the secondary cell, wherein the primary cell is configured with both uplink and downlink, wherein the secondary cell is configured with uplink-only operation, wherein the primary cell operates on new radio band n5 and the secondary cell operates on new radio band n8, and wherein a downlink allocation of new radio band n5 overlaps an uplink allocation of new radio band n8 over 880 MHz to 894 MHz;

receiving, from the primary cell, a scheduling pattern for scheduling communications of the primary cell and the secondary cell;

receiving, from the primary cell, an activation of the scheduling pattern; and communicating with the secondary cell based on the configuration of the secondary cell, including transmitting uplink communications on the secondary cell without receiving downlink communications on the secondary cell, wherein hybrid automatic repeat request acknowledgement or negative acknowledgement information associated with the secondary cell is communicated using downlink of the primary cell, and wherein uplink of the secondary cell is cross-carrier scheduled from downlink of the primary cell, wherein the carrier aggregation configuration provides a time division multiplexing pattern configuration for the primary cell and for the secondary cell, wherein the time division multiplexing pattern configuration prevents uplink communications on the secondary cell and downlink communications on the primary cell from occurring at an overlapping time such that the apparatus does not transmit on the uplink allocation of new radio band n8 while receiving on the overlapping downlink allocation of new radio band n5.

2. The apparatus of claim 1, wherein scheduling occasions of the scheduling pattern are non-overlapping between the primary cell and the secondary cell.

3. The apparatus of claim 1, wherein the at least one memory storing the instructions, when executed by the at least one processor, further cause the apparatus at least to perform dynamically switching the scheduling pattern based on a received downlink control information format or a control element of medium access control signaling.

4. The apparatus of claim 1, wherein the carrier aggregation configuration indicates that the secondary cell at least partially uses a same physical resource block allocation as the primary cell.

5. A method, comprising:

receiving, from a primary cell, while the apparatus is in a radio resource control connected state with the primary cell, a radio resource control message comprising a carrier aggregation configuration of a secondary cell with uplink, wherein the configuration indicates that downlink is deactivated for the secondary cell, wherein the carrier aggregation configuration is applicable to carrier aggregation of the primary cell and the secondary cell, wherein the primary cell is configured with both uplink and downlink, wherein the secondary cell is configured with uplink-only operation, wherein the primary cell operates on new radio band n5 and the secondary cell operates on new radio band n8, and wherein a downlink allocation of new radio band n5 overlaps an uplink allocation of new radio band n8 over 880 MHz to 894 MHz;

receiving, from the primary cell, a scheduling pattern for scheduling communications of the primary cell and the secondary cell;

receiving, from the primary cell, an activation of the scheduling pattern; and communicating with the secondary cell based on the configuration of the secondary cell, including transmitting uplink communications on the secondary cell without receiving downlink communications on the secondary cell, wherein hybrid automatic repeat request acknowledgement or negative acknowledgement information associated with the secondary cell is communicated using downlink of the primary cell, and wherein uplink of the secondary cell is cross-carrier scheduled from downlink of the primary cell, wherein the carrier aggregation configuration provides a time division multiplexing pattern configuration for the primary cell and for the secondary cell, wherein the time division multiplexing pattern configuration prevents uplink communications on the secondary cell and downlink communications on the primary cell of the apparatus from occurring at an overlapping time such that the apparatus does not transmit on the uplink allocation of new radio band n8 while receiving on the overlapping downlink allocation of new radio band n5.

6. The method of claim 5, wherein the carrier aggregation configuration comprises a two-uplink and two-downlink carrier aggregation configuration for the primary cell and the secondary cell, and wherein only uplink of the secondary cell is activated while downlink of the secondary cell is deactivated.

7. The method of claim 6, wherein the time division multiplexing pattern configuration defines first time resources during which downlink reception on the primary cell is permitted and uplink transmission on the secondary cell is prohibited, and second time resources during which uplink transmission on the secondary cell is permitted and downlink reception on the primary cell is prohibited.

8. The method of claim 7, wherein the activation of the scheduling pattern is received in a medium access control control element.

9. The method of claim 8, wherein the scheduling pattern is selected from among a plurality of radio resource control configurations stored by the apparatus for uplink and downlink usage of the primary cell and the secondary cell.

10. The method of claim 9, wherein the plurality of radio resource control configurations are bandwidth-part-specific configurations, and wherein switching between the plurality of radio resource control configurations is performed based on bandwidth part switching.

11. The method of claim 10, wherein the uplink communications on the secondary cell are scheduled by downlink control information received on a physical downlink control channel of the primary cell.

12. The method of claim 11, wherein the apparatus does not monitor a physical downlink control channel of the secondary cell for scheduling the uplink communications on the secondary cell while the downlink of the secondary cell is deactivated.

13. The method of claim 12, wherein the carrier aggregation configuration indicates that, when scheduling of the uplink of the secondary cell follows scheduling of an uplink of the primary cell, a same physical resource block allocation is used for the uplink of the primary cell and the uplink of the secondary cell.

14. The method of claim 13, wherein the new radio band n5 comprises an uplink allocation from 824 MHz to 849 MHz and a downlink allocation from 869 MHz to 894 MHz, wherein the new radio band n8 comprises an uplink allocation from 880 MHz to 915 MHz and a downlink allocation from 925 MHz to 960 MHz, and wherein the time division multiplexing pattern configuration prevents transmission by the apparatus on any uplink resource of the secondary cell within 880 MHz to 894 MHz while the apparatus receives downlink communications on the primary cell.

* * * * *